United States Patent Office 2,713,545
Patented July 19, 1955

2,713,545

WATER-BASE PAINTS AND PROCESS OF MAKING

William S. Kather, Schenectady, N. Y., assignor to General Electric Company, a corporation of New York No Drawing. Application May 27, 1952,
Serial No. 290,314

8 Claims. (Cl. 106—148)

This invention is concerned with improving the properties of water-base paints. More particularly, the invention relates to water-base paints of improved properties and characteristics obtained by incorporating in the aforesaid water-base paint a minor proportion of a water-soluble alkali-metal salt of a hydrocarbon-substituted silane triol.

Within recent years pigmented coating compositions generally applicable in the architectural finishing field have appeared on the market wherein the liquid vehicle for such paints is a water base. One of these water-base paints comprises casein powder intimately dispersed and dissolved in the water phase. Another type of water-base paint comprises an emulsion of oil-modified alkyd resin (that is, an oil-modified resinous product obtained by effecting reaction between a polyhydric alcohol and a polybasic acid) in which, again, the vehicle or dispersing medium for the resinous composition is water. Water-base paints which have received enthusiastic reception are the so-called rubber-base paints which generally comprise latices of rubber, for instance, natural rubber, rubbers comprising copolymers of butadiene and styrene, etc., which are intimately dispersed in the water or are in the form of an emulsion with the water employing the usual dispersing or emulsifying agents known in the art.

Although water-base paints enjoy great popularity in the coating and finishing arts, they are nevertheless subject to certain disadvantages. With respect to the use of casein paints, it has been found that if one washes the surface coated with such casein paint, the casein film tends to dissolve quite readily in washing and abrades easily so that unless extreme care is taken the paint film will be worn away in short order. In addition, such casein paints tend to show undesirable brush marks after application of the casein paints to surfaces. Moreover, with respect to rubber latex paints, it has been found that there is an undesirable lack of adhesion of the rubber latex paint films to the surfaces to which they are applied. Finally, water-base paints seem to suffer because of the fact that they are stained quite easily by aqueous materials.

It is therefore one of the objects of the invention to improve the washability of dried paint films made from water-base paints.

It is another object of the invention to improve the brushing qualities of casein water-base paints and to obtain smoother dried paint films.

Another object of the invention is to improve the adhesion of rubber latex paint films to various surfaces.

It is a further object of the present invention to improve the resistance of films of water-base paints to staining by various aqueous media.

In accordance with my invention, I have found that all the foregoing objects can be attained by incorporating in the aforesaid water-base paints an aqueous solution of a water-soluble alkali-metal salt of a hydrocarbon-substituted silane triol. It is within the scope of the invention to employ the water-soluble alkali-metal salts of the hydrocarbon-substituted silane triol (for brevity hereinafter referred to as "alkali-metal salt") in the form of a dehydrated powder which can be added to the dry casein prior to forming the water-base paint, or can be added as a powder to the various other water-base paints referred to above. In certain instances, where the stability of a water paint may be changed by the addition of the alkali-metal salt, it may be desirable to modify the paint formulation somewhat to avoid this condition. Thus, for instance, it may be advisable to select certain ingredients used in making the paints, for example, emulsifying agents, which are not deleteriously affected by the alkali-metal salt. It should be noted that the incorporation of other silicon-containing materials as, for instance, silicone oils or silicone resins, does not give the results herein described using the metallic salts.

The alkali-metal salts employed in the practice of the present invention may be prepared from mono-organosilane triols or their condensation products and are described, for example, by Meads and Kipping, Journal of the Chemical Society, 105, page 679. A specific method for preparing the alkali-metal salts comprises hydrolyzing derivatives of a monohydrocarbon-substituted silane containing three hydrolyzable radicals, for instance, halogen atoms, alkoxy radicals, etc., connected to silicon, recovering the hydrolysis products and dissolving these products in an aqueous solution of an alkali-metal hydroxide in such proportion that there is preferably, although not necessarily, present at least one equivalent of base per silicon atom. Additional directions for making the metallic salts may be found disclosed in Elliott and Krieble Patent 2,507,200, issued May 9, 1950. The resultant solution containing the soluble metallic salt is diluted to the desired concentration, partially or completely neutralized, if desired, with salts such as aluminum nitrate, aluminum acetate, etc., as is more particularly disclosed and claimed in Torkelson application Serial No. 290,318, filed concurrently herewith and assigned to the same assignee as the present invention, and is used in combination with the water-base paint. Alternatively, after making the solution of the alkali-metal salt, the latter may be dehydrated to give the metallic salt in the form of a finely divided powder which, in turn, can be added to the dry form of the paint prior to mixing with the water vehicle or can be added directly to the water-base paint in the aqueous medium.

The hydrolyzable monohydrocarbon-substituted silanes described above may be considered as having the formula $$RSiX_3$$

where R is a monovalent hydrocarbon radical, for example, alkyl (e. g., methyl, ethyl, propyl, isopropyl, butyl, hexyl, decyl, etc.), aryl (e. g., phenyl, naphthyl, biphenyl, etc.), aralkyl (e. g., benzyl, phenylethyl, etc.), alkaryl (e. g., tolyl, xylyl, etc.), and substituted hydrocarbon radicals in which the substitutent is nonreactive with the hydrolyzable medium or with the alkali-metal hydroxide base used to make the metallic salt. Such substituents are, for instance, halogens, e. g., chlorine, bromine, fluorine, etc. In the above formula X may be a halogen, for instance, chlorine, bromine, fluorine, etc.; alkoxy, e. g., methoxy, ethoxy, propoxy, etc.; amino groups, e. g., the —NH$_2$ grouping. Preferably, X is a halogen, particularly chlorine.

The inorganic bases employed to make the metallic salts are preferably bases of the alkali metals. Among such bases may be mentioned, for example, potassium hydroxide, sodium hydroxide, cesium hydroxide, etc.

Generally, it is desirable when making the metallic salt solution in water to use as concentrated a form thereof as practicable. For example, concentrations of the metallic salt ranging from about 20 to 50 per cent total solids content are advantageously used. Thereafter, such high concentration solutions can be diluted with water to the desired lower concentrations applicable for incorporation in the water-base paints. It may be desired to add small amounts of alcohols or ketones to the water solution of the metallic salt in order to enhance the stability of such solutions and lower their freezing point. In this respect small amounts of alcohols, ketones, or ethers are advantageously employed wherein the latter are miscible with the water solution of the metallic salt. Ethanol is particularly effective and renders the water solution of the alkali-metal salt stable in concentrations ranging from about 1 to 40 per cent.

The amount of metallic salt which may be employed in combination with the water-base paints may be varied within wide limits. Based on the weight of the solid matter in the water-base pain (for instance, the pigment, binder, etc.), improvement in the properties of the water-base paint for coating purposes is noted when amounts ranging from about 0.1 to 7 per cent of the alkali-metal salt (i. e., $RSiO_2M$ where R is a monovalent hydrocarbon radical and M is an alkali metal) are employed. Stated alternatively, the concentration of the alkali-metallic salt, on a weight basis, calculated as $RSiO_{1.5}$, where R is a monovalent hydrocarbon radical, is preferably within the range of from about 0.05 to 5 per cent of the total weight of the solids matter in the paint. It will, of course, be apparent to those skilled in the art that larger or smaller concentrations of the alkali-metal salt may be employed depending on the particular water-base paint used, the type of alkali-metal salt employed, degree of performance, etc.

Unexpectedly, it has been found that the amount of metallic salt which is used in combination with water-base paints will also vary depending on the type of surface to which the water-base paint is applied. Thus, it has been noted that applications of the water-base paints containing the alkali-metal salt to usual plastered surfaces, namely, gypsum surfaces or plaster board, will require different amounts of the metallic salt to yield the same properties. Generally, the more dense the surface, particularly as it applies to a gypsum sub-surface, the less alkali-metal salt is required to yield equivalent properties in the deposited coating. This will be evident from the examples described below.

In order that those skilled in the art may better understand how the present invention may be practiced, the following examples are given by way of illustration and not by way of limitation. All parts are by weight.

EXAMPLE 1

1 mol of methyltrichlorosilane was hydrolyzed by adding it rapidly with stirring to a large excess of water. The amount of water present was substantially in excess of that required to effect complete hydrolysis of all the silicon-bonded chlorine in the methyltrichlorosilane.

The resultant solution was allowed to stand until substantially all the methylpolysiloxane had precipitated in the form of a fine powder. This powder was filtered from the remaining solution, washed to remove acid, filtered, and dried. The solid gel particles were dissolved by stirring with a 50 per cent, by weight, aqueous sodium hydroxide solution. In general, one mol of the methylpolysiloxane is allowed to react with about 1 to 1.05 mols of sodium hydroxide to give the alkali-metal salt. The resultant alkaline solution had a total solids content of about 46.7 per cent of which about 14.3 per cent was titrated as sodium oxide and contained about 30 per cent methylpolysiloxane solids calculated as $CH_3SiO_{1.5}$ (there being present about 2.4 per cent impurities as NaCl and $Na_2CO_3$). The composition had a specific gravity of about 1.35 at 25° C. and a pH of about 13. This sodium salt of methylsilane triol (which is also known as sodium methyl siliconate) is believed to have structure I in dilute aqueous solutions, and it can be dried to a white solid having structure II as its molecular formula:

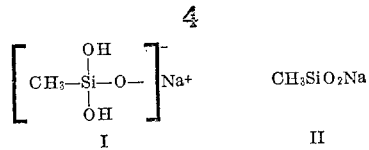

EXAMPLE 2

In this example, 100 grams of a casein powder having the following per cent composition, by weight,

| Ingredient: | Per cent |
| --- | --- |
| Casein | 7 |
| Hydrated lime | 3 |
| Amorphous calcium carbonate | 40 |
| Magnesium silicate | 30 |
| Aluminum silicate | 15 |
| Titanium calcium oxide | 5 | were mixed with stirring with 72 grams of water containing 3.3 grams of the aqueous solution of the sodium methyl siliconate described in Example 1. There was thus obtained a water-base casein paint which was applied to three different types of gypsum surfaces. One surface was a somewhat porous gypsum surface (Pyrobar manufactured by U. S. Gypsum Co.), the second surface was a gypsum lath surface, and the last surface comprised a dense gypsum surface. Other mixtures of the casein paint and the sodium methyl siliconate were prepared in which different ratios of the aforesaid sodium methyl siliconate to the casein powder were used whereby in the percent of silicone, i. e., calculated as $CH_3SiO_{1.5}$ in the form of sodium methyl siliconate varied in each case. Each of the casein paints containing the sodium methyl siliconate was applied by brushing to the above-described gypsum surfaces, and allowed to air-dry for 3 hours. Each of the surfaces was then subjected to a conventional washability test in which a detergent was continuously applied to the painted surface while the surface was mechanically scrubbed with a brush under carefully controlled conditions similar to those employed in Federal Specification TT–P–141b issued by Bureau of Federal Supply dated January 15, 1949. The scrubbing was continued until a portion of the paint film ruptured or was removed from the surface, exposing the surface beneath. The number of brush strokes required in each case to achieve this end point are recorded below in Table I. It should be noted that the conditions of the tests are more severe than would be normally encountered in common usage.

Table I

| Surface | Weight Percent $CH_3SiO_{1.5}$ in the Form of Sodium Methyl Siliconate | Number of Strokes to Expose Surface |
| --- | --- | --- |
| Gypsum (porous) | None | 11 |
|  | 0.4 | 14 |
|  | 1.0 | 22 |
|  | 2.0 | 34 |
|  | 3.0 | 46 |
| Gypsum lath | None | 4 |
|  | 0.1 | 9 |
|  | 0.5 | 12 |
|  | 1.0 | 14 |
|  | 3.0 | 34 |
| Gypsum (dense) | None | 7 |
|  | 0.4 | 14 |
|  | 0.5 | 28 |
|  | 1.0 | 38 |

It was noted that in every case where the films contained the sodium methyl siliconate, such films dried into much smoother surfaces than did the films deposited from the paints in which the sodium methyl siliconate was absent. It was also found that the brushing quality of the paint at the time of application to the various surfaces was greatly improved as a result of the presence of the sodium methyl siliconate in the respective paints.

EXAMPLE 3

In this example, various amounts of the aqueous solution of sodium methyl siliconate defined in Example 1 were added with stirring to 100 grams of an alkyd water-emulsion paint having the following percent, by weight, composition:

| | Per cent |
|---|---|
| Total pigment content | 52 |
| Titanium dioxide | 13 |
| Lithopone | 49 |
| Aluminum silicate | 23 |
| Mica powder | 9 |
| Diatomaceous silica | 6 |
| Total vehicle content | 48 |
| Castor-oil-modified glyceryl phthalate alkyd resin | 29 |
| Water | 68 |
| Emulsifying agent | 3 |

These mixtures were then applied to a gypsum surface (Pyrobar), air-dried for 3 hours, and tested for washability similarly as was done in Example 2. A control in which the sodium methyl siliconate was omitted was also tested for washability. The following Table II shows the concentrations used, together with the results of the washability tests.

*Table II*

| Weight* Percent $CH_3SiO_{1.5}$ in the Form of Sodium Methyl Siliconate | Number of Strokes to Expose Surface |
|---|---|
| None | 30 |
| 0.1 | 77 |
| 0.4 | 104 |
| 0.5 | 107 |
| 1.0 | 94 |

*Based on total weight of water-base paint.

Again, it was noted that the brushing quality of the paint containing the sodium methyl siliconate was better than the control from which the sodium methyl siliconate was omitted.

EXAMPLE 4

About 1.1 grams of the aqueous solution of sodium methyl siliconate described in Example 1 were added with stirring to 100 grams of a rubber-base latex emulsion paint having the following weight per cent composition:

| | Per cent |
|---|---|
| Total Pigment Content | 29 |
| Titanium dioxide | 46 |
| Lithopone | 13 |
| Diatomaceous silica | 41 |
| Total Vehicle Content | 71 |
| Butadiene-styrene copolymer | 29 |
| Water | 68 |
| Emulsifying agent | 3 |

The above latex water-base paint containing the additive and a sample of the paint without additive were applied to a gypsum surface. After permitting each surface to air-dry, it was found that the film containing the sodium methyl siliconate had greater adhesion to the under surface of gypsum than did the film from which the sodium methyl siliconate had been omitted. In addition, it was found that the former paint film was scarcely stained by aqueous materials and the stained portion could easily be washed away, whereas the stained portion of the film containing no sodium methyl siliconate remained stained despite washing several times.

It will, of course, be apparent to those skilled in the art that instead of using the water-base paints described above, other types of water-base paints may be employed. Thus, soya protein may be used, together with the casein paint or in place of the latter. In addition, casein may be used in small amounts with both the aforesaid alkyd and rubber emulsion formulations. Examples of other water-base paints may be found, for instance, in U. S. Patents 2,093,487; 2,143,334; 2,404,463; 2,427,481; 2,490,677 and 2,498,712.

It is also intended that the amount of alkali-metal salt used in combination with the various water-base paints may be varied widely as pointed out above, and no limiting proportions are intended to be read into the foregoing examples. Obviously, other organic alkali siliconates (alkali-metal salts of other organosilane triols), such as potassium methyl siliconate, sodium phenyl siliconate, sodium ethyl siliconate, etc. may be used in place of the sodium methyl siliconate employed in the foregoing examples. In general, the organic alkali siliconates employed in the practice of the present invention may be considered as corresponding to the general formula

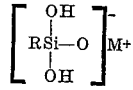

where R is a monovalent hydrocarbon radical, many examples of which have been given above, and M is an alkali metal. As pointed out above, instead of using aqueous solutions of the metallic salts, it may be desirable to dehydrate the latter to obtain dry compositions of the alkali-metal siliconates.

The water-base paints containing the alkali-metal salts herein described are eminently useful for coating other surfaces, for instance, wood, etc., to give films which can be readily washed without deterioration of the film, and which films in many instances have improved adhesion to the under surface.

What I claim as new and desire to secure by Letters Patent of the United States is:

1. A composition of matter comprising (1) a water-base paint selected from the class consisting of water-base casein paints, water-base rubber paints, and water-base oil-modified alkyd resin paints, and (2) from 0.1 to 7 per cent, by weight, based on the weight of the solids content of the aforesaid water-base paint, of a water-soluble alkali-metal salt of a hydrocarbon-substituted silane triol.

2. A composition of matter comprising (1) a water-base casein paint, and (2) from 0.1 to 7 per cent, by weight, based on the weight of the solids content of the aforesaid casein paint of a water-soluble sodium salt of methylsilane triol calculated as $CH_3SiO_2Na$.

3. A composition of matter comprising (1) a water-base rubber paint and (2) from 0.1 to 7 per cent, by weight, based on the weight of the solids content of the aforesaid rubber paint of a water-soluble sodium salt of methylsilane triol calculated as $CH_3SiO_2Na$.

4. A composition of matter comprising (1) a water-base oil-modified alkyd resin paint and (2) from 0.1 to 7 per cent, by weight, based on the weight of the solids content of the aforesaid oil-modified alkyd resin paint of a water-soluble sodium salt of methylsilane triol calculated as $CH_3SiO_2Na$.

5. The process for improving the washability of water-base paints selected from the class consisting of water-base casein paints, water-base rubber paints, and water-base oil-modified alkyd resin paints, which comprises incorporating in the aforesaid water-base paint from 0.1 to 7 per cent, by weight, based on the weight of the solids content of the aforesaid water-base paint, of a water-soluble alkali-metal salt of a hydrocarbon-substituted silane triol.

6. The process for improving the washability and brushing qualities of a water-base casein paint which comprises incorporating in the aforesaid paint from 0.1 to 7 per cent, by weight, based on the weight of the solids content of the aforesaid casein paint, of a powdered water-soluble sodium salt of methylsilane triol calculated as $CH_3SiO_2Na$.

7. The process for improving the washability and adhesion of a water-base rubber paint which comprises incorporating in the latter from 0.1 to 7 per cent, by weight, based on the weight of the solids content of the aforesaid paint, of a water-soluble sodium salt of methylsilane triol calculated as $CH_3SiO_2Na$.

8. The process for improving the washability and adhesion of a water-base oil-modified alkyd resin paint which comprises incorporating in the latter from 0.1 to 7 per cent, by weight, based on the weight of the solids content of the aforesaid paint, of a water-soluble sodium salt of methylsilane triol calculated as $CH_3SiO_2Na$.

References Cited in the file of this patent

UNITED STATES PATENTS

| | | |
|---|---|---|
| 2,441,422 | Krieble et al. | May 11, 1948 |
| 2,443,067 | Burns | June 8, 1948 |
| 2,482,888 | Walsh | Sept. 27, 1949 |
| 2,507,200 | Elliott et al. | May 9, 1950 |